United States Patent
Ozawa et al.

(10) Patent No.: US 7,569,638 B2
(45) Date of Patent: Aug. 4, 2009

(54) THERMOPLASTIC ELASTOMER COMPOSITION

(75) Inventors: Hiroshi Ozawa, Tsukuba (JP); Yuichi Katoh, Kitakanbara-gun (JP); Motohiro Fukuda, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 182 days.

(21) Appl. No.: 11/587,921

(22) PCT Filed: Apr. 25, 2005

(86) PCT No.: PCT/JP2005/007768

§ 371 (c)(1),
(2), (4) Date: Oct. 26, 2006

(87) PCT Pub. No.: WO2005/103144

PCT Pub. Date: Nov. 3, 2005

(65) Prior Publication Data

US 2007/0225418 A1 Sep. 27, 2007

(30) Foreign Application Priority Data

Apr. 26, 2004 (JP) .............................. 2004-129386

(51) Int. Cl.
*C08L 51/04* (2006.01)
(52) U.S. Cl. ............................. 525/71; 525/80; 525/85
(58) Field of Classification Search .................... 525/70, 525/71, 80, 85
See application file for complete search history.

(56) References Cited

U.S. PATENT DOCUMENTS

| | | | | |
|---|---|---|---|---|
| 4,243,568 | A | * | 1/1981 | Brown .......................... 524/562 |
| 5,502,095 | A | * | 3/1996 | Ueshima et al. .............. 524/269 |
| 6,348,542 | B1 | * | 2/2002 | Naruse et al. ................. 525/71 |

FOREIGN PATENT DOCUMENTS

| | | |
|---|---|---|
| JP | 58 215443 | 12/1983 |
| JP | 59 086650 | 5/1984 |
| JP | 06 009932 | 1/1994 |
| JP | 06 345933 | 12/1994 |
| JP | 9216967 | 8/1997 |
| JP | 10 101860 | 4/1998 |
| JP | 2003 96250 | 4/2003 |

* cited by examiner

*Primary Examiner*—Jeffrey C Mullis
(74) *Attorney, Agent, or Firm*—Oblon, Spivak, McClelland Maier & Neustadt, P.C.

(57) ABSTRACT

To provide a thermoplastic elastomer composition which is excellent in light resistance and flexibility and has high tear strength. [MEANS FOR SOLVING PROBLEMS] A thermoplastic elastomer composition comprising 100 parts by mass of acrylic multi-layer polymer particles (A) which each comprise at least two layers, i.e., at least one inner rubber layer (I) and at least one outermost thermoplastic resin layer (II), 5 to 300 parts by mass of an ethylene/vinyl ester copolymer (B), and 0.5 to 150 parts by mass of a graft copolymer (C) composed of an ethylene/vinyl ester copolymer backbone and a graft bonded to the backbone which consists of units derived from a monomer having a polarity higher than that of the backbone.

17 Claims, No Drawings

THERMOPLASTIC ELASTOMER COMPOSITION

TECHNICAL FIELD

The present invention relates to thermoplastic elastomer compositions each including specific acrylic multiphase structured polymer particles, an ethylene-vinylester copolymer, and a specific graft copolymer. These thermoplastic elastomer compositions are excellent in light stability and flexibility and give films having high tear strength.

BACKGROUND ART

Acrylic resins are excellent in light stability, have beautiful appearances and good optical transparency, and can be molded easily. They have therefore been widely used in, for example, parts of electric appliances, car parts, optical parts, ornaments, and signboards. With increasing uses, investigations have been made to further improve performance of such acrylic resins. Under these circumstances, demands have been made to positively use acrylic resins as replacements for plasticized poly(vinyl chloride)s in thin molded articles such as films and sheets. These thin molded articles are used in consideration of cost reduction. The replacement is intended, for example, to avoid or reduce the load to the environment when such plasticized poly(vinylchloride)s are discarded by incineration. Current acrylic resins, however, are susceptible to improvements, because they have high hardness and are limited in their uses. For example, films and sheets including acrylic multiphase structured polymer particles are provided (see, for example, Patent Documents 1 and 2). These films and sheets eliminate the need of use of such hard acrylic resins directly as molding materials. The films disclosed in these documents, however, are molded articles derived from acrylic multiphase structured polymer particles alone and are poor in tear strength. Certain thermoplastic elastomer compositions include thermoplastic polymers in addition to acrylic multiphase structured polymer particles, but they are still susceptible to improvements in tear strength when molded into films (see, for example, Patent Document 3).

Patent Document 1: Japanese Unexamined Patent Application Publication (JP-A) No. S58-215443

Patent Document 2: Japanese Unexamined Patent Application Publication (JP-A) No. S59-86650

Patent Document 3: Japanese Unexamined Patent Application Publication (JP-A) No. H09-216967

DISCLOSURE OF INVENTION

Problems to be Solved by the Invention

Accordingly, an object of the present invention is to provide a thermoplastic elastomer composition which is excellent in light stability and flexibility and yields a film having high tear strength.

Means for Solving the Problems

After intensive investigations to achieve the above object, the present inventors have found that a thermoplastic elastomer composition including acrylic multiphase structured polymer particles, an ethylene-vinylester copolymer, and a specific graft copolymer may achieve the above object. The present invention has been accomplished based on these findings.

Specifically, the present invention relates to:

(1) a thermoplastic elastomer composition including 100 parts by mass of acrylic multiphase structured polymer particles (A); 5 to 300 parts by mass of an ethylene-vinyl ester copolymer (B); and 0.5 to 150 parts by mass of a graft copolymer (C) including an ethylene-vinyl ester copolymer main chain and a graft bonded to the main chain, the graft including a monomer unit having a polarity higher than that of the main chain;

(a) wherein the acrylic multiphase structured polymer particles (A) each contain two or more phases including at least one inner rubber phase (I) and at least one outermost thermoplastic resin layer (II);

(b) wherein the rubber component phase (I) is a phase of a copolymer derived from a monomer mixture (i) including 50 to 99.99 parts by mass of an acrylic ester, 49.99 to 0 part by mass of another monofunctional monomer copolymerizable with the acrylic ester, and 0.01 to 10 parts by mass of a polyfunctional monomer, (c) wherein the thermoplastic resin component phase (II) is a phase of a polymer derived from a monomer component (ii) including 40 to 100 parts by mass of a methacrylic ester and 60 to 0 part by mass of another monofunctional monomer copolymerizable with the methacrylic ester, (d) wherein a polymer constituting an outermost phase of the thermoplastic resin component phase (II) has a number-average molecular weight of 30,000 or less as determined by gel permeation chromatography (GPC), (e) wherein a ratio of the total mass of the rubber component phase (I) to the total mass of the thermoplastic resin component phase (II) [(I)/(II)] is 30/70 to 90/10, and (f) wherein the acrylic multiphase structured polymer particles (A) each have an average particle diameter of 150 nm or less, (2) the thermoplastic elastomer composition according to (1), wherein the graft bonded to the main chain of the graft copolymer (C) includes, as a monomer unit, at least one selected from the group consisting of (meth) acrylate monomer units, vinyl ether monomer units, (meth)acrylamide monomer units, and acrylonitrile monomer units;

(3) the thermoplastic elastomer composition according to (2), wherein the graft bonded to the main chain of the graft copolymer (C) includes a methyl methacrylate unit as a monomer unit;

(4) a molded articles comprising the thermoplastic elastomer composition according to (1);

(5) a film or sheet comprising the thermoplastic elastomer composition according to (1); and (6) a composite molded articles including a section comprising the thermoplastic elastomer composition according to (1).

EFFECT OF THE INVENTION

According to an embodiment of the present invention, there are provided thermoplastic elastomer compositions which are excellent in light stability e and flexibility and yield films having high tear strength.

BEST MODE FOR CARRYING OUT THE INVENTION

The present invention will illustrated with reference preferred embodiments below. It should be noted, however, the following description is shown only by example and never intended to limit the scope of the present invention.

Acrylic multiphase structured polymer particles (A) for use in the present invention each have at least one inner rubber component phase (I), and at least one outermost thermoplastic resin component phase (II) (hereinafter also referred to as phase (I) and phase (II), respectively). The number of phases constituting the acrylic multiphase structured polymer particles (A) for use in the present invention has only to be 2 or more. The particles can include three phases and can also include four or more phases. Examples of phases structures of the particles include a two-phase structure of [Phase(I) (core phase)/Phase (II) (outermost phase)]; three-phase structures including [Phase (I) (innermost phase)/phase (I) (intermediate phase)/Phase (II) (outermost phase)], [Phase (I) (innermost phase)/Phase (II) (intermediate phase)/Phase (II) (outermost layer)], and [phase (II) (innermost layer)/Phase (I) (intermediate phase)/phase (II) (outermost phase)]; and four-phase structures including [Phase (I) (innermost phase)/ Phase (II) (intermediate phase)/Phase (I) (intermediate phase)/Phase (II) (outermost phase)]. Of these structures, preferred are a two-phase structure of [Phase (I) (core phase)/ Phase (II) (outermost phase)], and three-phase structures of [Phase (I) (innermost phase)/Phase (I) (intermediate layer)/ Phase (II) (outermost phase)] and [Phase (II) (innermost layer)/Phase (I) (intermediate phase)/Phase (II) (outermost phase)]. These phase structures are excellent in handleability.

The acrylic multiphase structured polymer particles (A) should have a ratio of the total mass of Phase (I) to the total mass of Phase (II) [(I)/(II)] within a range of 30/70 to 90/10. If the proportion of Phase (I) is less than 30 percent by mass, a molded article obtained from the resulting thermoplastic elastomer composition may have insufficient elastic recovery properties. In contrast, if the proportion of Phase (I) exceeds 90 percent by mass, the acrylic multiphase structured polymer particles (A) may not form a satisfactory phase structure and thereby have remarkably decreased melt fluidity. Thus, it is difficult to carry out melting, kneading and molding of acrylic multiphase structured polymer particles (A) with other components such as the ethylene-vinyl ester copolymer (B). When only one phase constitutes Phase (I) in the acrylic multiphase structured polymer particles (A), the term "total mass" of Phase (I) refers to the mass of the one phase. When two or more layers constitute Phase (I), the "total mass" refers to the total sum of the masses of the two or more phases. Likewise, when only one phase constitutes Phase (II) in the acrylic multiphase structured polymer particles (A), the term "total mass" of Phase (II) refers to the mass of the one phase. When two or more phases constitute Phase (II), the "total mass" refers to the total sum of the masses of the two or more layers. The ratio of the total mass of Phase (I) to that of Phase (II) [(I)/(II)] is preferably within a range of 50/50 to 90/10 and more preferably within a range of 60/40 to 90/10.

Phase (I) of the acrylic multiphase structured polymer particles (A) for use in the present invention should include a copolymer of a monomer mixture (i) including 50 to 99.99 percent by mass of an acrylic ester, 49.99 to 0 percent by mass of another monofunctional monomer copolymerizable with the acrylic ester, and 0.01 to 10 percent by mass of a polyfunctional monomer. The monomer mixture (i) preferably contains 55 to 99.9 percent by mass of an acrylic ester, 44.9 to 0 percent by mass of another monofunctional monomer copolymerizable with the acrylic ester, and 0.1 to 2 percent by mass of a polyfunctional monomer. If the amount of the acrylic ester is less than 50 percent by mass, the acrylic multiphase structured polymer particles (A) may have reduced rubber elasticity and thermoplastic elastomer composition may have decreased light stability. If it exceeds 99.99 percent by mass, the acrylic multiphase structured polymer particles (A) may not form a satisfactory layer structure and thereby have remarkably decreased melt fluidity. Thus, it is difficult to carryout melting, kneading and molding of the acrylic multiphase structured polymer particles (A) with other components such as the ethylene-vinyl ester copolymer (B). If the amount of the polyfunctional monomer exceeds 10 percent by mass, the acrylic multiphase structured polymer particles (A) may not exhibit rubber elasticity and have insufficient elastic recovery properties. If it is less than 0.01 percent by mass, Phase (I) may not constitute a structure as particles.

When the acrylic multi-layer polymer particles (A) include two or more Phase (I), the amounts of polyfunctional monomers in monomer mixtures (i) constituting respective Phase (I) should each be 0.01 to 10 percent by mass, respectively, in principle.

Specific examples of acrylic esters for constituting Layer (I) include acrylic esters of saturated aliphatic alcohols having one to eighteen carbon atoms, such as methyl acrylate, ethyl acrylate, n-propyl acrylate, isopropyl acrylate, n-butyl acrylate, isobutyl acrylate, s-butyl acrylate, t-butyl acrylate, pentyl acrylate, hexyl acrylate, octyl acrylate, 2-ethylhexyl acrylate, dodecyl acrylate, and octadecyl acrylate; acrylic esters of alicyclic alcohols having five or six carbon atoms, such as cyclohexyl acrylate; acrylic esters of phenols, such as phenyl acrylate; and acrylic esters of aromatic alcohols, such as benzyl acrylate. Each of these can be used alone or in combination and can be appropriately selected according to the purpose and/or use.

Methacrylic esters are representative examples of other monofunctional monomers copolymerizable with such acrylic esters for constituting Layer (I). Examples of such methacrylic esters include methacrylic esters of saturated aliphatic alcohols having one to twenty-two carbon atoms, such as methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, dodecyl methacrylate, myristyl methacrylate, palmityl methacrylate, stearyl methacrylate, and behenyl methacrylate; methacrylic esters of alicyclic alcohols having five or six carbon atoms, such as cyclohexyl methacrylate; methacrylic esters of phenols, such as phenyl methacrylate; and methacrylic esters of aromatic alcohols, such as benzyl methacrylate. Examples of other monofunctional monomers further include aromatic vinyl monomers such as styrene, alpha-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and halogenated styrenes; vinyl cyanide monomers such as acrylonitrile and methacrylonitrile; and conjugated diene monomers such as butadiene and isoprene. Each of these can be used alone or in combination and can be appropriately selected according to the purpose and/or use.

Polyfunctional monomers for constituting Layer (I) refer to monomers each having two or more carbon-carbon double bonds per molecule. Such polyfunctional monomers include, for example, esters of unsaturated monocarboxylic acids, such as acrylic acid, methacrylic acid, and cinnamic acid, with unsaturated alcohols such as allyl alcohol and methallyl alcohol; diesters of the unsaturated monocarboxylic acids with diols such as ethylene glycol, butanediol, and hexanediol; and esters of dicarboxylic acids, such as phthalic acid, terephthalic acid, isophthalic acid, and maleic acid, with the unsaturated alcohols. Specific examples thereof include allyl acrylate, methallyl acrylate, allyl methacrylate, methallyl methacrylate, allyl cinnamate, methallyl cinnamate, diallylmaleate, diallyl phthalate, diallyl terephthalate, diallyl isophthalate, divinylbenzene, ethylene glycol di(meth)acrylates, butanediol di(meth)acrylates, and hexanediol di (meth) acrylates. Each of these can be used alone or in combination and can be appropriately selected according to the purpose and/or use. Among them, allyl methacrylate is preferred. The term "di(meth)acrylates" is a generic term of "diacrylate" and "dimethacrylate".

Phase (II) of the acrylic multiphase structured polymer particles (A) for use in the present invention should include a polymer derived from a monomer (mixture) (ii) including 40 to 100 percent by mass of a methacrylic ester and 60 to 0 percent by mass of another monomer copolymerizable with the methacrylic ester. The content of the methacrylic ester in the monomer (mixture) (ii) is preferably 60 to 99 percent by mass and more preferably 80 to 99 percent by mass. If the content of the methacrylic ester is less than 40 percent by mass, the acrylic multiphase structured polymer particles (A) may have insufficient light stability.

Specific examples of methacrylic esters for constituting Phase (II) include methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate, octadecyl methacrylate, phenyl methacrylate, and benzyl methacrylate. Of these, methyl methacrylate is preferred.

Specific examples of other monomers copolymerizable with the methacrylic ester for constituting Phase (II) include acrylic esters of saturated aliphatic alcohols having one to eighteen carbon atoms, such as methyl acrylate, ethyl acrylate, n-propyl acrylate, isopropyl acrylate, n-butyl acrylate, isobutyl acrylate, s-butyl acrylate, t-butyl acrylate, pentyl acrylate, hexyl acrylate, octyl acrylate, 2-ethylhexyl acrylate, dodecyl acrylate, and octadecyl acrylate; acrylic esters of alicyclic alcohols having five or six carbon atoms, such as cyclohexyl acrylate; aromatic vinyl monomers such as styrene, alpha-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and halogenated styrenes; vinyl cyanide monomers such as acrylonitrile and methacrylonitrile; maleimide monomers such as maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, and N-(chlorophenyl)maleimide; and the above-exemplified polyfunctional monomers. Of these, preferred are acrylic acid alkyl esters such as methyl acrylate, ethyl acrylate, and n-butyl acrylate.

In acrylic multiphase structured polymer particles (A) for use in the present invention, the types, amounts and other parameters of monomers may be appropriately selected within the above-specified types and amounts of monomers, so that Phase (I) includes a polymer component having rubber elasticity and that Phase (II) includes a polymer component having thermoplasticity.

In the acrylic multiphase structured polymer particles (A) for use in the present invention, a polymer constituting an outermost layer of the thermoplastic resin Phase (II) should have a number-average molecular weight of 30,000 or less as determined by gel permeation chromatography (GPC). If the number average molecular weight exceeds 30,000, the acrylic multiphase structured polymer particles (A) may have decreased melt fluidity. The lower limit of the number-average molecular weight is not strictly limited. However, the number-average molecular weight is preferably not less than 1,000 so as to passage through manufacturing steps of the acrylic multiphase structured polymer particles (A) in production processes. The number-average molecular weight is typically preferably within a range of 3,000 to 20,000 so as to ensure both satisfactory elastic recovery properties and satisfactory passage during production processes.

The acrylic multiphase structured polymer particles (A) for use in the present invention should have an average particle diameter of 150 nm or less. If the acrylic multiphase structured polymer particles (A) have an average particle diameter exceeding 150 nm, the melt fluidity may be insufficient in some cases. The average particle diameter is not specifically limited on its lower limit. However, the average particle diameter is preferably 30 nm or more, because the resulting acrylic multiphase structured polymer particles (A) may easily form a predetermined layer structure. The average particle diameter is more preferably 80 to 120 nm.

The acrylic multiphase structured polymer particles (A) for use in the present invention preferably have a three-phase structure including an innermost rubber component phase (Ia), a rubber component phase (Ib), and an outermost thermoplastic resin component phase (II), from the viewpoints of properties and easiness in production. The innermost rubber component phase (Ia) includes a monomer mixture (ia). The rubber component phase (Ib) includes a monomer mixture (ib) and is arranged adjacent to the rubber component phase (Ia) so as to cover the outer surface of the rubber component phase (Ia). The outermost thermoplastic resin component phase (II) includes a monomer (mixture) (ii). The same monomers as those for constituting Phase (I) can be used as acrylic esters, polyfunctional monomers, and monofunctional monomers copolymerizable with the acrylic esters for constituting Phases (Ia) and (Ib).

The followings are preferred to ensure excellent tear strength and good mechanical properties such as flexibility concurrently, in a thermoplastic elastomer composition obtained using the acrylic multiphase structured polymer particles (A) according to a preferred embodiment of the present invention. Specifically, the difference between the content (percent by mass) of an acrylic ester in the monomer mixture (ia) and the content (percent by mass) of an acrylic ester in the monomer mixture (ib) is preferably 3 percent by mass or more. The difference can be indicated by [(ia) (in percent by mass) minus (ib) (in percent by mass) or (ib) (in percent by mass) minus (ia) (in percent by mass)]. More preferably, the content (ia) (in percent by mass) is larger than the content (ib) (in percent by mass)] by 3 percent by mass or more.

In the acrylic multiphase structured polymer particles (A) according to a preferred embodiment, the mass ratio of the rubber layer (Ia) to the rubber component phase (Ib) [(Ia)/(Ib)] is preferably 5/95 to 95/5 and more preferably 20/80 to 80/20. When the mass ratio [(Ia)/(Ib)] is within a range of 5/95 to 95/5, excellent tear strength (tear resistance) and appropriate flexibility, and other mechanical properties can be generally obtained concurrently.

The acrylic multiphase structured polymer particles (A) according to a preferred embodiment basically includes three phases, i.e., the innermost rubber component phase (Ia), the adjacent rubber component phase (Ib), and the outermost thermoplastic resin component phase (II). One or more optional polymer phases may further be arranged between Phase (Ib) and Phase (II). To exhibit advantages of the present invention significantly, the total mass of the rubber component phase (Ia), the rubber component phase (Ib), and the thermoplastic resin component phase (II) is preferably 80 percent by mass or more of the total mass of the acrylic multiphase structured polymer particles (A). More preferably, the acrylic multiphase structured polymer particles (A) includes the rubber component phase (Ia), the rubber component phase (Ib), and the thermoplastic resin component phase (II) alone.

The acrylic multiphase structured polymer particles (A) for use in the present invention can be prepared according to a known method of preparing acrylic multiphase structured polymer particles each including two or more layers. In the method, the step of carrying out a polymerization reaction for forming a rubber component phase and the step of carrying out a polymerization reaction for forming a thermoplastic resin component phase are carried out in a predetermined order to thereby form phase sequentially in the order from a core phase to an outer phase. The resulting acrylic multiphase structured polymer particles include at least one inner rubber component phase and at least one outermost thermoplastic resin component phase. There is no limitation in a polymerization process for preparing the acrylic multiphase structured polymer particles (A) for use in the present invention. The particles (A) may be prepared, for example, by emulsion polymerization, suspension polymerization, solution polymerization, or a combination of these processes according to a known polymerization procedure for preparing regular acrylic multiphase structured polymer particle. According to emulsion polymerization, for example, the acrylic multiphase structured polymer particles (A) may be prepared by carrying out polymerizations for forming respective phases according to known procedures. In this process, the following points should be noted.

(1) To carry out copolymerization of a monomer mixture (i) in the polymerization reaction step (a) for forming the rubber layer (I) by using a monomer mixture (i) including 50 to 99.99 percent by mass of an acrylic ester, 49.99 to 0 percent by mass of another monofunctional monomer copolymerizable with the acrylic ester, and 0.01 to 10 percent by mass of a polyfunctional monomer.

(2) To carry out polymerization of a monomer (mixture) (ii) in the polymerization reaction step (b) for forming the thermoplastic resin layer (II), by using a monomer (mixture) (ii) including 40 to 100 percent by mass of a methacrylic ester and 60 to 0 percent by mass of another monomer copolymerizable with the methacrylic ester.

(3) To carry out a polymerization reaction using a molecular weight modifier in an amount of, preferably, 0.4 to 10 percent by mass relative to the monomer (mixture) (ii) in at least the step of carrying out a polymerization reaction for forming an outermost thermoplastic resin layer (II) of the polymerization reaction step (b).

(4) To set a ratio of the total mass of the monomer mixture (i) to that of the monomer (mixture) (ii) [(i)/(ii)] in entire steps of carrying out polymerization reactions at 30/70 to 90/10.

(5) To control the average particle diameter of the acrylic multi-layer polymer particles (A) at 150 nm or less at the completion of all the polymerization reaction steps.

To prepare regular multilayer polymer particles, the amount of a molecular weight modifier for forming an outermost thermoplastic resin component phase is about 0 to about 0.3 percent by mass relative to a monomer mixture. To prepare the acrylic multiphase structured polymer particles (A) for use in the present invention, however, a thermoplastic resin component constituting the phase may have an excessively high number average molecular weight, if the amount of a molecular weight modifier is less than 0.4 percent by mass. In this case, the resulting molded articles prepared by molding thermoplastic elastomer compositions according to the present invention may have insufficient elastic recovery properties and exhibit insufficient flowability during molding. It is enough to use a molecular weight modifier in an amount of 10 percent by mass at highest relative to the monomer mixture in the preparation of the acrylic multiphase structured polymer particles (A) for use in the present invention. If a molecular weight modifier is used in an amount exceeding this range, the effect of imparting elastic recovery properties becomes saturated, but the amount of a residual molecular weight modifier in the acrylic polymer particles (A) is undesirably high. The amount of the molecular weight modifier is preferably within a range of 0.4 to 5 percent by mass and more preferably within a range of 0.6 to 2 percent by mass relative to the monomer (mixture) (ii).

Specific examples of molecular weight modifier include mercaptans such as n-octylmercaptan, t-octylmercaptan, n-dodecylmercaptan, t-dodecylmercaptan, and mercaptoethanol; terpene mixtures containing terpinolene, dipentene, t-terpinen, and small amounts of other cyclic terpenes; and halogenated hydrocarbons such as chloroform and carbon tetrachloride. Of these, alkylmercaptans such as n-octylmercaptan are preferred.

The temperature in emulsion polymerization is not specifically limited but is generally in a range of 0° C. to 100° C. Emulsifiers for use herein include alkali metal salts of fatty acids, such as sodium oleate, sodium laurate, and sodium stearate; sulfate salts of fatty acid alcohols, such as sodium lauryl sulfate; resinate salts such as potassium resinate; alkylarylsulfonate salts such as sodium dodecylbenzenesulfonate; and phosphate salts such as sodium polyoxyethylenealkylphosphates. Each of these may be used alone or in combination.

Radical polymerization initiators are generally used as polymerization initiators in the emulsion polymerization. Specific examples of such radical polymerization initiators include persulfates such as potassium persulfate and ammonium persulfate, and peroxides such as azobisisobutyronitrile and benzoyl peroxide. These can be used alone. In addition, redox polymerization initiators can also be used as radical polymerization initiators. Examples thereof are combinations of an organic hydroperoxide and a reducing agent. The organic hydroperoxide includes, for example, cumene hydroperoxide, diisopropylbenzene hydroperoxide, and p-menthane hydroperoxide. The reducing agent can be, for example, a transition metal salt.

Acrylic multiphase structured polymer particles (A) formed as a result of emulsion polymerization can be separated and obtained according to a known or conventional procedure. The procedure herein can be, for example, acid precipitation, salt precipitation, spray drying, and freeze coagulaton. Partial fusion of particles is acceptable in the outermost phase comprising a thermoplastic resin component and constituting the separated resulting acrylic multiphase structured polymer particles (A).

The content of the ethylene-vinyl ester copolymer (B) for use in the present invention should be 5 to 300 parts by mass and is preferably 10 to 200 parts by mass, and more preferably 30 to 120 parts by mass, relative to 100 parts by mass of the acrylic multiphase structured polymer particles (A). If the content of the ethylene-vinyl ester copolymer (B) is less than 5 parts by mass, the ethylene-vinyl ester copolymer (B) may not effectively act to increase the tear strength. If it exceeds 300 parts by mass, the acrylic multiphase structured polymer particles (A) may not effectively act to exhibit excellent light stability.

The ethylene-vinyl ester copolymer (B) for use in the present invention is not specifically limited, as long as it does not adversely affect the advantages of the present invention.

Ethylene-vinyl acetate random copolymers are preferred from the viewpoints typically of flexibility, moldability and processability, and transparency of molded articles. The content of ethylene units in an ethylene vinyl acetate random copolymer, if used as the ethylene-vinyl 1 ester copolymer (B), is preferably 95 to 60 percent by mass, and more preferably 85 to 70 percent by mass.

The content of the graft copolymer (C) for use in the present invention should be 0.5 to 150 parts by mass and is preferably 1 to 100 parts by mass, and more preferably 2 to 40 parts by mass, to 100 parts by mass of the acrylic multiphase structured polymer particles (A). The graft copolymer (C) includes an ethylene-vinyl ester copolymer main chain and a graft bonded to the main chain, which graft includes a monomer unit having a polarity higher than that of the main chain. If the content of the graft copolymer (C) is less than 0.5 part by mass, the resulting thermoplastic elastomer composition may whiten when it is stretched. If the content exceeds 150 parts by mass, the effect of addition of the graft copolymer (C) may become saturated and invite increased cost.

The ratio of the mass of ethylene units to that of vinyl ester units of an ethylene-vinyl ester copolymer constituting the main chain of the graft copolymer (C) is preferably 95:5 to 60:40.

A graft bonded to the main chain of the graft copolymer (C) for use in the present invention preferably contains, as its monomer units, at least one monomer unit selected from (meth)acrylate monomer units, vinyl ether monomer units, (meth)acrylamide monomer units, and acrylonitrile monomer units.

The ethylene/vinyl ester copolymer as the backbone of the graft copolymer (C) may include any monomer units not specifically limited, as long as they do not adversely affect the advantages of the present invention. For example, the copolymer may mainly contain ethylene and vinyl ester monomer units and may further contain one or more other units derived from monomers such as propylene, butadiene, isoprene, and isobutylene, in amounts of 20 percent by mass or less. When the other monomer units are conjugated dienes such as butadiene and isoprene, some or all of unsaturated double bonds of polymer blocks are preferably hydrogenated.

Examples of monomer units constituting as the graft bonded to the backbone of the graft copolymer (C) and having a higher polarity than that of the backbone are (meth)acrylate monomer units, vinyl ether monomer units, (meth)acrylamide monomer units, and acrylonitrile monomer units. Specific examples thereof include alkyl (meth)acrylates such as methyl (meth)acrylates, ethyl (meth)acrylates, butyl (meth)acrylates, dodecyl (meth)acrylates, and 2-ethylhexyl (meth)acrylates; vinyl esters such as vinyl acetate and vinyl pivalate; (meth)acrylamindes; and (meth)acrylonitriles. Each of these can be used alone or in combination. Among them, methyl methacrylate, ethyl acrylate, butyl acrylate, and acrylonitrile are preferred.

The graft may include one or more vinyl monomer units having at least one selected from carboxyl group, epoxy group, carboxylic anhydride group, and amino group. The amount of monomer units to constitute a graft is preferably 10 to 60 percent by mass, based on the mass of the graft copolymer (C).

The number-average molecular weights of the ethylene/vinyl ester copolymer (B) and the graft copolymer (C) for use in the present invention are not specifically limited, within ranges not adversely affecting the advantages of the present invention, and are preferably $2\times10^4$ to $200\times10^4$, from the viewpoints typically of flexibility, moldability/processability, and transparency of molded articles.

Where necessary, thermoplastic elastomer compositions according to the present invention may further contain one or more property improvers for improving the properties of molded articles, films, and sheets molded from the compositions, within ranges not adversely affecting the advantages of the present invention. Such property improvers are not specifically limited and may include, for example, additives such as antioxidants, ultraviolet absorbers, and lubricants. Specific examples thereof are antioxidants, thermal stabilizers, light stabilizers, ultraviolet absorbers, neutralizing agents, lubricants, antifogging agents, antiblocking agents, paraffin oils, slipping agents, crosslinking agents, crosslinking aids, colorants, flame-retarders, dispersing agents, and antistatic agents.

Thermoplastic elastomer compositions according to the present invention may be prepared by adding, mixing, and/or kneading the acrylic multiphase structured polymer particles (A), the ethylene-vinyl ester copolymer (B), and the graft copolymer (C), or where necessary, these components with other components such as other resins and property modifiers. These components are preferably mixed and then kneaded. In this case, for example, a tumbler, a mixer, or a blender can be used as a mixing machine, and a screw extruder can be used as a kneading machine.

The thermoplastic elastomer compositions according to the present invention may be molded and processed into molded articles having various shapes. Molding processes for use herein include extrusion molding such as profile extrusion molding and extruded-sheet molding, injection molding, inflation molding, blow molding, press forming, calendaring molding, melt lamination molding, hollow molding, compression molding, vacuum molding, and expansion molding. The resulting molded articles may be in the form of, for example, powders, pellets, plates, films or sheets, pipes, hollow bodies, and box shapes. The molded articles are generally excellent in flexibility and can be suitably used as flexible members typically in car parts, parts of electric appliances, wire coverings, medical-use parts, general merchandises, and footwear. The thermoplastic elastomer compositions according to the present invention are also excellent in adhesion with other resins and can be used as flexible layers in multilayer assemblages and flexible members of composite molded articles.

The thicknesses of films and sheets prepared from the thermoplastic elastomer compositions according to the present invention are not specifically limited, and are generally about 1000 to about 20 μm. In particular, the thermoplastic elastomer compositions can easily yield films and sheets having small thicknesses of about 300 to about 20 μm.

Films and sheets derived from the thermoplastic elastomer compositions according to the present invention may be suitably used typically as agricultural materials such as films for farm implements; designed films such as marking films and decorating films; industrial-use sheets such as dicing sheets and back grinding sheets; packaging films; and general-purpose sheets such as desk mats and partitions.

The term "composite molded article" used herein refers to a molded article having a section derived from the thermoplastic elastomer composition according to the present invention at least partially, and further has another region derived from another material. A preferred example of such composite molded articles is a molded article including a flexible (soft) section and a hard section. The flexible section is derived from the thermoplastic elastomer composition according to the present invention. The hard section is derived from a thermoplastic resin and has hardness higher than the flexible section. Such thermoplastic resins having hardness higher than the flexible section include, but are not limited to, styrenic resins, acrylic resins, polyester resins, polyamide resins, polyacetal resins, polycarbonates, ethylenic ionomers, and poly(vinylidene fluoride)s. The composite molded articles according to the present invention may be advantageously used typically in constructional materials, furnishing materials, electric/electronic components, agricultural/civil engineering materials, vehicular materials, pipes/hoses, daily necessaries, general merchandises, and stationeries

EXAMPLES

The present invention will be illustrated in further detail with reference to several preparation examples, examples, and comparative examples below, which by no means limit the scope of the present invention. The measurements in the preparation examples, examples, and comparative examples were evaluated according to the following evaluation methods.

(1) Average Particle Diameter of Acrylic Multi-Layer Polymer Particles (A)

The average particle diameter of acrylic multi-layer polymer particles (A) was determined by measuring the particle diameters of a sample sampled from a latex after the completion of polymerization using the laser particle size analyzer PAR-III [the product of OTSUKA ELECTRONICS CO., LTD.] and analyzing the diameters by a cumulant method.

(2) Number-Average Molecular Weight of Outermost Layer in Acrylic Multi-Layer Polymer Particles (A)

The number-average molecular weight of a polymer component constituting the outermost layer of the acrylic multi-layer polymer particles (A) was determined in the following manner. A sample of acrylic multi-layer polymer particles (A) was sufficiently stirred in toluene at room temperature and was centrifuged to yield a solution. The number-average molecular weight of the resulting solution was determined by gel permeation chromatography (GPC), and this was defined as the number-average molecular weight of a polymer constituting the outermost layer in the present invention.

(3) Determination of Hardness

The hardness of a sample was determined according to Japanese Industrial Standards (JIS) K6253 using an Oscar's type A hardness tester.

(4) Tear Strength Test

An angle test piece without nick was prepared, and the tear strength of the test piece was determined at a rate of 100 mm/min. using an autograph (the product of Shimadzu Corporation) according to JIS K 6252.

(5) Tensile Test

A No. 3 dumbbell test piece was prepared, and the tensile elongation of the test piece was determined at a pulling rate of 200 mm/min. using an autograph (the product of Shimadzu Corporation) according to JIS K 6301.

(6) Light Stability

An acceleration test of a sample was carried out for 2000 hours using a Sunshine Weather Meter S80 produced by SUGA TEST INSTRUMENTS at a black panel temperature of 63° C., humidity of 50%, a spray cycle of 18 minutes per two hours. The tensile elongations of the sample before and after the test were determined, and the light resistance was evaluated based on the retention of tensile elongation after the test.

(7) Whitening Upon Elongation

The degree of whitening of an elongated portion at 30% elongation under the conditions in the tensile test was visually evaluated according to the following criteria.

Good: The sample does not whiten.
Fair: The sample slightly whitens.
Poor: The sample whitens.

Monomers used in the preparation examples and abbreviations thereof (in the parentheses) are shown below.

Methyl methacrylate (MMA), n-butyl acrylate (BA), methyl acrylate (MA), styrene (St), and allyl methacrylate (ALMA).

The followings were used in examples and comparative examples below as the ethylene/vinyl ester copolymer (B) and the graft copolymer (C) including an ethylene/vinyl ester copolymer backbone and a graft bonded to the backbone, the graft including a monomer unit having a polarity higher than that of the backbone.

1. Ethylene/vinyl ester copolymer (b) (hereinafter briefly referred to as EVA)

The product of Tosoh Corporation under the trade name of "Ultracen 635" was used. The product is an ethylene/vinyl acetate copolymer.

2. Graft copolymer (C) including an ethylene/vinyl ester copolymer backbone and a graft bonded to the backbone, the graft including a monomer unit having a polarity higher than that of the backbone [hereinafter briefly referred to as EVA-g-PMMA]

The product of NOF CORPORATION under the trade name of "Modiper A6200" was used. The product is a graft copolymer including 70 percent by mass of EVA as a backbone component and 30 percent by mass of poly(methyl methacrylate) as a graft component.

Preparation Example 1

Preparation of Multiphase Structured Polymer Particles (A-1)

In a polymerization reactor having stirring blades, a condenser, and a dropping funnel in a nitrogen atmosphere were placed 200 parts by mass of distilled water, 0.6 part by mass of NEOPELEX F-25 [the product of Kao Corporation] as an emulsifier, and 0.1 part by mass of sodium carbonate. The materials were dissolved homogenously by heating to 80° C. Next, the solution was combined with 0.05 part by mass of potassium peroxodisulfate and was further combined with a mixture added dropwise from the dropping funnel at 80° C. over one hour to form a first phase. The mixture contained 29.8 parts by mass of BA, 13.5 parts by mass of MMA, 6.5 parts by mass of St, 0.2 part by mass of ALMA, and 0.25 part by mass of Adekacol CS-141E [the product of Asahi Denka Kogyo K.K.] as an emulsifier. After the completion of the dropwise addition, the reaction was continued at the same temperature for further one hour, and a gas chromatographic analysis was carried out to find that the individual monomers were fully consumed.

Next, the prepared copolymer latex was combined with 0.025 part by mass of potassium peroxodisulfate, and was further combined with a mixture added dropwise from the dropping funnel over thirty minutes to form a second phase. The mixture contained 19.9 parts by mass of BA, 0.5 part by mass of MMA, 4.5 parts by mass of St, 0.1 part by mass of ALMA, and 0.125 part by mass of Adekacol CS-141E [the product of Asahi Denka Kogyo K.K.] as an emulsifier. After the completion of the dropwise addition, the reaction was continued at 80° C. for further one hour, and a gas chromatographic analysis was carried out to find that the individual monomers were fully consumed.

The resulting copolymer latex was combined with 0.025 part by mass of potassium peroxodisulfate and was further combined with a mixture added dropwise from the dropping funnel over thirty minutes to form a third phase. The mixture contained 23.75 parts by mass of MMA, 1.25 parts by mass of MA, 0.25 part by mass of n-octylmercaptan, and 0.125 part by mass of Adekacol CS-141E [the product of Asahi Denka Kogyo K.K.] as an emulsifier. After the completion of the dropwise addition, the reaction was continued at 80° C. for further one hour, a gas chromatographic analysis was carried out to find that the individual monomers were fully consumed, and the polymerization was completed. Multilayer polymer particles (A-1) in the resulting latex had an average particle diameter of 104 nm.

The latex was freeze-coagulated by cooling at −20° C. for five hours, and the coagulate was melted and extracted and was washed with three portions of hot water at 40° C. It was then dried at 60° C. under reduced pressure for two days and thereby yielded three-phased multiphase structured polymer particles (A-1) as coagulated particles (powder). A polymer component constituting the outermost phase had a number average molecular weight of 18,000. Outlines of polymer particles are shown in Table 1.

Preparation Example 2

Preparation of Multiphase Structured Polymer Particles (A-2)

In a polymerization reactor having stirring blades, a condenser, and a dropping funnel in a nitrogen atmosphere were placed 200 parts by mass of distilled water, 1 part by mass of sodium dodecylbenzenesulfonate, and 0.05 part by mass of sodium carbonate. The materials were homogenously dissolved by heating to 80° C. Next, the solution was combined with 0.01 part by mass of potassium peroxodisulfate and was further combined with a mixture continuously added dropwise from the dropping funnel over twenty minutes to form a first phase. The mixture contained 9.48 parts by mass of MMA, 0.5 part by mass of BA, and 0.02 part by mass of ALMA. After the completion of the dropwise addition, the reaction was continued at the same temperature for further thirty minutes, and a gas chromatographic analysis was carried out to find that the individual monomers were fully consumed.

Next, the resulting copolymer latex was combined with 0.03 part by mass of potassium peroxodisulfate and was further combined with a mixture continuously added dropwise over forty minutes to form a second phase. The mixture contained 1.34 parts by mass of MMA, 25.85 parts by mass of BA, and 0.81 part by mass of ALMA. After the completion of the dropwise addition, the reaction was continued at 80° C. for further thirty minutes, and a gas chromatographic analysis was carried out to find that the individual monomers were fully consumed.

Next, the resulting copolymer latex was combined with 0.06 part by mass of potassium peroxodisulfate and was further combined with a mixture added dropwise from the dropping funnel over hundred minutes to form a third phase. The mixture contained 55.8 parts by mass of MMA, 6.2 parts by mass of BA, and 0.3 part by mass of n-octylmercaptan. After the completion of the dropwise addition, the reaction was continued at 80° C. for further one hour, a gas chromatographic analysis was carried out to find that the individual monomers were fully consumed, and the polymerization was completed. The multilayer polymer particles (A-2) in the resulting latex had an average particle diameter of 99 nm.

The latex was freeze-coagulated by cooling at −20° C. for five hours, and the coagulate was melted and extracted and was washed with three portions of hot water at 80° C. The aggregate was then dried at 70° C. under reduced pressure for two days and thereby yielded three-layered multilayer polymer particles (A-2) as coagulated particles (powder). A polymer component constituting the outermost phase had a number average molecular weight of 98,000. Outlines of polymer particles are shown in Table 1.

Preparation Example 3

Preparation of Acrylic Multiphase Structured Polymer Particles (A-3)

Polymerization was carried out by the procedure of Preparation Example 1, except for using 0.125 part by mass of n-octylmercaptan as a monomer mixture for constituting the outermost phase. The resulting acrylic multiphase structured polymer particles (A-3) had an average particle diameter of 104 nm, and a polymer component constituting the outermost phase of the particles had a number-average molecular weight of 98,000. Outlines of polymer particles are shown in Table 1.

TABLE 1

|  | First-stage polymer (percent by mass) | Second-stage polymer (percent by mass) | Third-stage polymer (percent by mass) | Average particle diameter (nm) | Number-average molecular weight |
|---|---|---|---|---|---|
| Preparation Example 1 (A-1) | BA/MMA/St/ALMA (59.6/27.0/13.0/0.4) 50 parts by mass | BA/MMA/St/ALMA (79.6/2.0/18.0/0.4) 25 parts by mass | MMA/MA (95.0/5.0) 25 parts by mass | 104 | 18000 |
| Preparation Example 2 (A-2) | MMA/BA/ALMA (94.8/5.0/0.2) 10 parts by mass | MMA/BA/ALMA (4.8/92.3/2.9) 28 parts by mass | MMA/BA (90.0/10.0) 62 parts by mass | 99 | 98000 |
| Preparation Example 3 (A-3) | BA/MMA/St/ALMA (59.6/27.0/13.0/0.4) 50 parts by mass | BA/MMA/St/ALMA (79.6/2.0/18.0/0.4) 25 parts by mass | MMA/MA (95.0/5.0) 25 parts by mass | 104 | 98000 |

Examples 1 to 3 and

Comparative Examples 3, 5, and 7

The powdery three-phased acrylic multiphase structured polymer particles (A-1) prepared according to Preparation Example 1, EVA, and EVA-g-PMMA were mixed in proportions shown in Table 2. The mixture was molded at 200° C. into pellets using a twin-screw extruder having a 25 φ vent. The pellets were molded at 200° C. into sheets 1 mm thick using a compression molding machine. Measurements on the sheets were carried out. The results are shown in Table 2.

Comparative Example 1

The powdery three-phased acrylic multiphase structured polymer particles (A-1) prepared according to Preparation Example 1 were molded at 200° C. into pellets using a twin-screw extruder having a 25 φ vent. The pellets were molded at 200° C. into a sheet 1 mm thick using a compression molding machine. Measurements on the sheet were carried out. The results are shown in Table 2.

Comparative Example 2

A sheet was prepared and measurements on the sheet were conducted by the procedure of Example 1, except for using the powdery three-layered acrylic multiphase structured polymer particles (A-2) prepared according to Preparation Example 2 instead of the powdery three-phased acrylic multiphase structured polymer particles (A-1) prepared according to Preparation Example 1. The results are shown in Table 2.

Comparative Example 4

A sheet was prepared and measurements on the sheet were conducted by the procedure of Example 1, except for not using EVA-g-PMMA. The results are shown in Table 2.

Comparative Example 6

A sheet was prepared and measurements on the sheet were conducted by the procedure of Example 1, except for not using EVA. The results are shown in Table 2.

Comparative Example 8

A sheet was prepared and measurements on the sheet were conducted by the procedure of Example 1, except for using the powdery three-phased acrylic multiphase structured polymer particles (A-3) prepared according to Preparation Example 3 instead of the powdery three-phased acrylic multiphase structured polymer particles (A-1) prepared according to Preparation Example 1. The results are shown in Table 2.

The results in Table 2 show that Examples 1 to 3 satisfy all the requirements in the present invention and have improved tear strength as compared with Comparative Examples 1 and 3. Comparative Example 1 includes neither EVA nor EVA-g-PMMA. Comparative Example 3 does not satisfy the requirement in content of EVA as specified in the present invention.

The results in Table 2 also demonstrate that Comparative Example 2 using the acrylic multiphase structured polymer particles (A-2) is inferior in flexibility to Example 1. Comparative Example 2 does not satisfy the requirements in number-average molecular weight of the outermost phase of the thermoplastic resin component phase (II) and in ratio of the mass of the rubber component phase (I) to the total mass of thermoplastic resin component phase (II), which requirements are specified in the present invention. In contrast, Example 1 satisfies these requirements. They also demonstrate that Comparative Example 8 using the acrylic multiphase structured polymer particles (A-3) is inferior in flexibility to Example 1. Comparative Example 8 does not satisfy the requirement in number-average molecular weight of the outermost layer of the thermoplastic resin layer (II). In contrast, Example 1 satisfies this requirement.

Table 2 also demonstrates that Example 1 is improved in whitening upon elongation as compared with Comparative Examples 4 and 5. Comparative Examples 4 and 5 do not satisfy the requirement in content of EVA-G-PMMA as specified in the present invention.

Table 2 further indicates that Example 1 is improved in tear strength as compared with Comparative Examples 6 and 7 and has higher flexibility as compared with Comparative Example 7. Comparative Examples 6 and 7 do not satisfy the requirement in content of EVA as specified in the present invention.

INDUSTRIAL APPLICABILITY

According to the present invention, there are provided thermoplastic elastomer compositions which are excellent in light stability and flexibility and give films having high tear strength. Molded articles, films, and sheets molded from the compositions can be suitably used as flexible members typically in car parts, parts of electric appliances, wire coverings,

TABLE 2

|  |  | Ex. 1 | Ex. 2 | Ex. 3 | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
| --- | --- | --- | --- | --- | --- | --- | --- | --- | --- | --- | --- | --- |
| (A-1) | Part by mass | 100 | 100 | 100 | 100 |  | 100 | 100 | 100 | 100 | 100 |  |
| (A-2) | Part by mass |  |  |  |  | 100 |  |  |  |  |  |  |
| (A-3) | Part by mass |  |  |  |  |  |  |  |  |  |  | 100 |
| EVA | Part by mass | 40 | 100 | 40 |  | 40 | 5 | 40 | 40 |  | 4000 | 40 |
| EVA-g-PMMA | Part by mass | 5 | 5 | 30 |  | 5 | 5 |  | 0.3 | 5 | 10 | 5 |
| Hardness (JIS-A) | — | 74 | 80 | 89 | 70 | >95 | 73 | 75 | 76 | 72 | 93 | >95 |
| Tear strength | N/cm | 365 | 430 | 380 | 190 | 450 | 195 | 350 | 360 | 200 | 200 | 390 |
| Retention of tensile elongation after test | % | 85 | 80 | 85 | 92 | 86 | 90 | 83 | 82 | 90 | 15 | 85 |
| Whitening upon elongation | — | Good | Good | Good | Good | Good | Good | Poor | Fair | Good | Good | Good | medical-use parts, general merchandises, and footwear. The thermoplastic elastomer compositions according to the present invention are also excellent in adhesion with other resins and can be used as flexible layers in multilayer assemblages and flexible members of composite molded articles.

The invention claimed is:

1. A thermoplastic elastomer composition comprising 100 parts by mass of acrylic multi-layer polymer particles (A); 5 to 300 parts by mass of an ethylene/vinyl ester copolymer (B); and 0.5 to 150 parts by mass of a graft copolymer (C) including an ethylene/vinyl ester copolymer backbone and a graft chain bonded to the backbone, the graft chain including a monomer unit having a polarity higher than that of the backbone;
   (a) wherein the acrylic multi-layer polymer particles (A) each contain two or more layers including at least one inner rubber layer (I) and at least one outermost thermoplastic resin layer (II);
   (b) wherein the rubber layer (I) is a layer of a copolymer derived from a monomer mixture (i) comprising 50 to 99.99 parts by mass of an acrylic ester, 49.99 to 0 part by mass of another monofunctional monomer copolymerizable with the acrylic ester, and 0.01 to 10 parts by mass of a polyfunctional monomer,
   (c) wherein the thermoplastic resin layer (II) is a layer of a polymer derived from a monomer component (ii) comprising 40 to 100 parts by mass of a methacrylic ester and 60 to 0 part by mass of another monofunctional monomer copolymerizable with the methacrylic ester,
   (d) wherein a polymer constituting an outermost layer of the thermoplastic resin layer (II) has a number-average molecular weight of 30,000 or less as determined by gel permeation chromatography (GPC),
   (e) wherein a ratio of the total mass of the rubber layer (I) to the total mass of the thermoplastic resin layer (II) [(I)/(II)] is 30/70 to 90/10, and
   (f) wherein the acrylic multi-layer polymer particles (A) each have an average particle diameter of 150 nm or less.

2. The thermoplastic elastomer composition according to claim 1, wherein the graft chain bonded to the backbone of the graft copolymer (C) comprises, as a monomer unit, at least one selected from the group consisting of (meth)acrylate monomer units, vinyl ether monomer units, (meth)acrylamide monomer units, and acrylonitrile monomer units.

3. The thermoplastic elastomer composition according to claim 2, wherein the graft chain bonded to the backbone of the graft copolymer (C) comprises a methyl methacrylate unit as a monomer unit.

4. A molded article prepared from the thermoplastic elastomer composition according to claim 1.

5. A film or sheet prepared from the thermoplastic elastomer composition according to claim 1.

6. A composite molded article comprising a section prepared from the thermoplastic elastomer composition according to claim 1.

7. The thermoplastic elastomer composition of claim 1, wherein said rubber layer (I) is a layer of a copolymer derived from a monomer mixture (i) comprising contains 55 to 99.9 percent by mass of an acrylic ester, 44.9 to 0 percent by mass of another monofunctional monomer copolymerizable with the acrylic ester, and 0.1 to 2 percent by mass of a polyfunctional monomer.

8. The thermoplastic elastomer composition of claim 1, wherein said acrylic ester of monomer mixture (i) is at least one ester selected from the group consisting of acrylic esters of saturated aliphatic alcohols having one to eighteen carbon atoms, acrylic esters of alicyclic alcohols having five or six carbon atoms, acrylic esters of phenols, and acrylic esters of aromatic alcohols.

9. The thermoplastic elastomer composition of claim 1, wherein said acrylic ester of monomer mixture (i) is at least one ester selected from the group consisting of methyl acrylate, ethyl acrylate, n-propyl acrylate, isopropyl acrylate, n-butyl acrylate, isobutyl acrylate, s-butyl acrylate, t-butyl acrylate, pentyl acrylate, hexyl acrylate, octyl acrylate, 2-ethylhexyl acrylate, dodecyl acrylate, and octadecyl acrylate; cyclohexyl acrylate, phenyl acrylate; and benzyl acrylate.

10. The thermoplastic elastomer composition of claim 1, wherein said another monofunctional monomer copolymerizable with said acrylic ester is at least one monomer selected from the group consisting of methacrylic esters of saturated aliphatic alcohols having one to twenty-two carbon atoms, methacrylic esters of alicyclic alcohols having five or six carbon atoms, methacrylic esters of phenols, methacrylic esters of aromatic alcohols, aromatic vinyl monomers, vinyl cyanide monomers, and conjugated diene monomers.

11. The thermoplastic elastomer composition of claim 1, wherein said another monofunctional monomer copolymerizable with said acrylic ester is at least one monomer selected from the group consisting of methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, dodecyl methacrylate, myristyl methacrylate, palmityl methacrylate, stearyl methacrylate, and behenyl methacrylate, cyclohexyl methacrylate, phenyl methacrylate, benzyl methacrylate, styrene, α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, halogenated styrenes, acrylonitrile, methacrylonitrile, butadiene and isoprene.

12. The thermoplastic elastomer composition of claim 1, wherein said monomer component (ii) comprises 60 to 99 percent by mass of said acrylic ester.

13. The thermoplastic elastomer composition of claim 1, wherein said monomer component (ii) comprises 80 to 99 percent by mass of said acrylic ester.

14. The thermoplastic elastomer composition of claim 1, wherein said methacrylic ester of monomer component (ii) is at least one methacrylic ester selected from the group consisting of methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate, octadecyl methacrylate, phenyl methacrylate, and benzyl methacrylate.

15. The thermoplastic elastomer composition of claim 1, wherein said number-average molecular weight is not less than 1,000.

16. The thermoplastic elastomer composition of claim 1, wherein said average particle diameter is 30 nm or more.

17. The thermoplastic elastomer composition of claim 1, wherein said ethylene/vinyl ester copolymer (B) and said graft copolymer (C) each have a number-average molecular weight from $2 \times 10^4$ to $200 \times 10^4$.

* * * * *